Aug. 16, 1932.  C. U. PALMER  1,872,170
AIRCRAFT
Filed Oct. 20, 1930   6 Sheets-Sheet 1
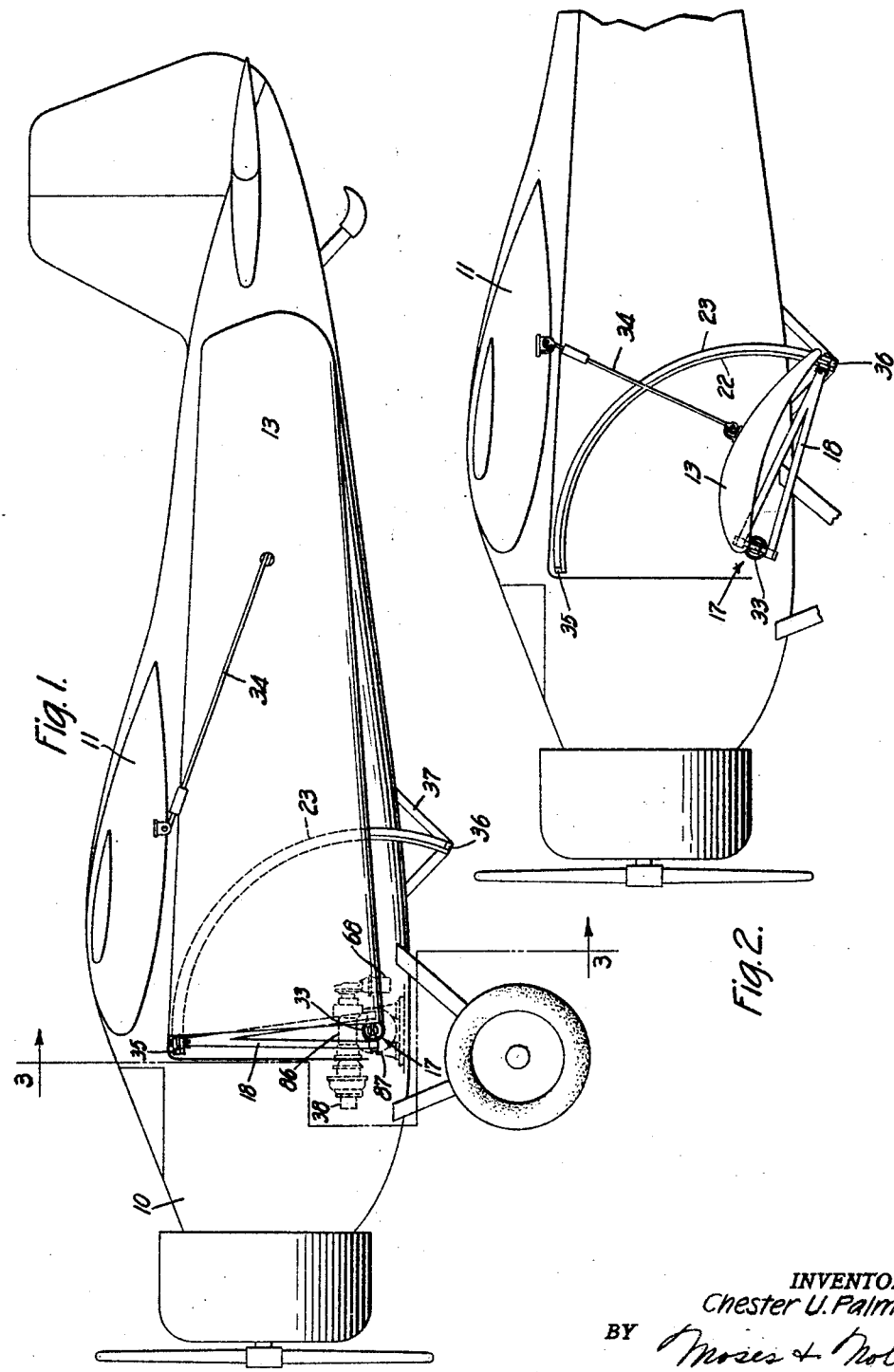
INVENTOR
Chester U. Palmer.
BY
ATTORNEYS

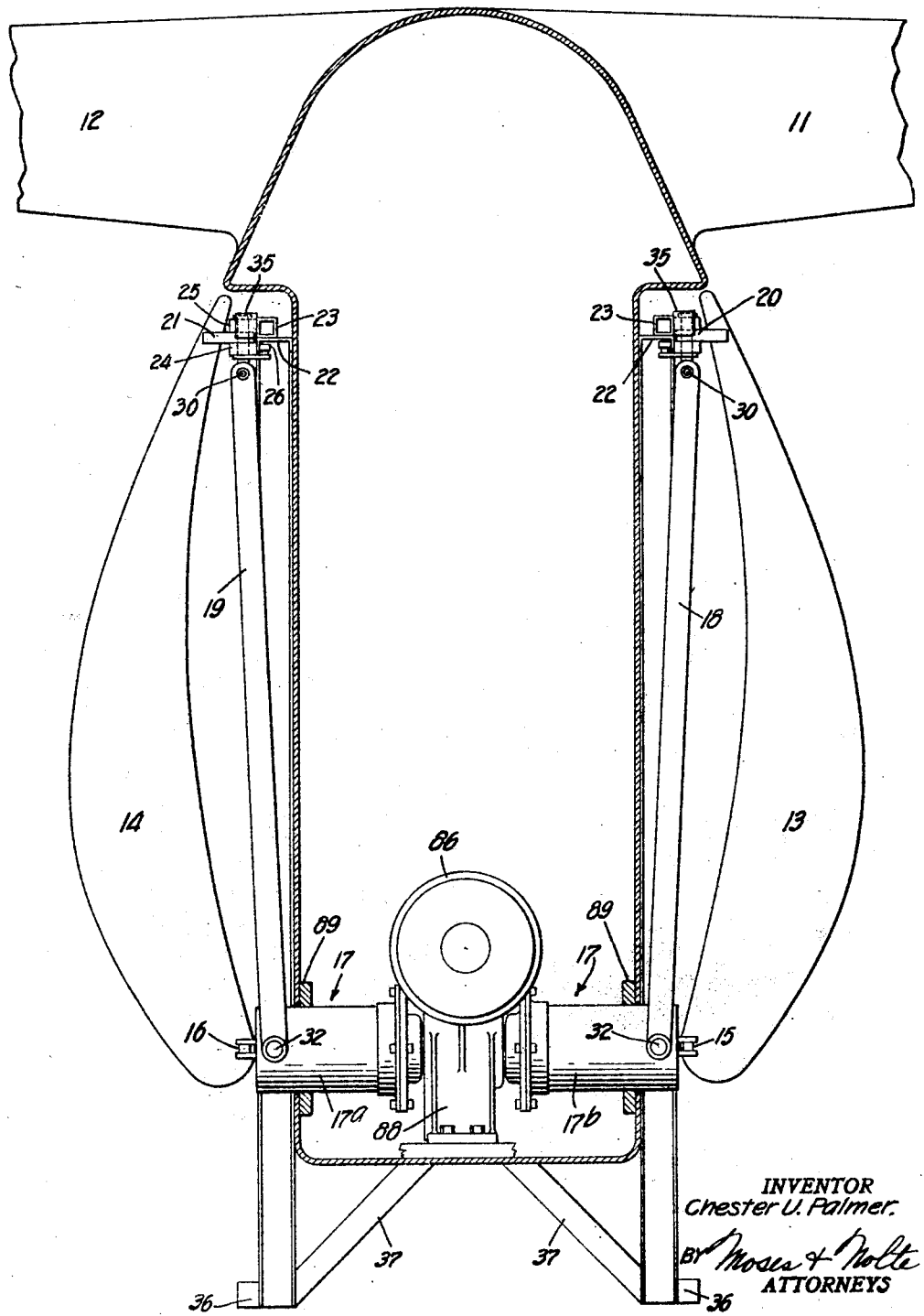

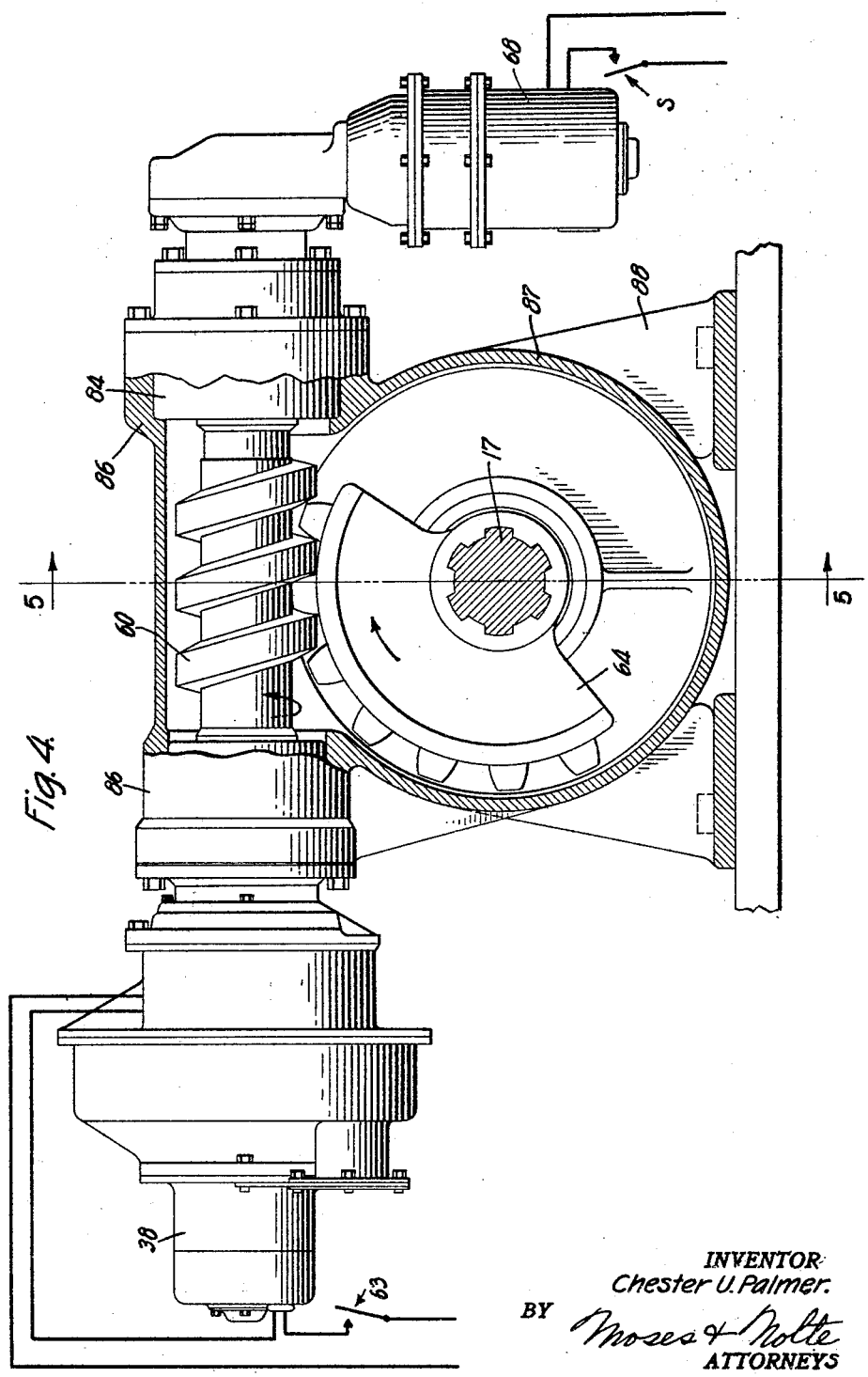

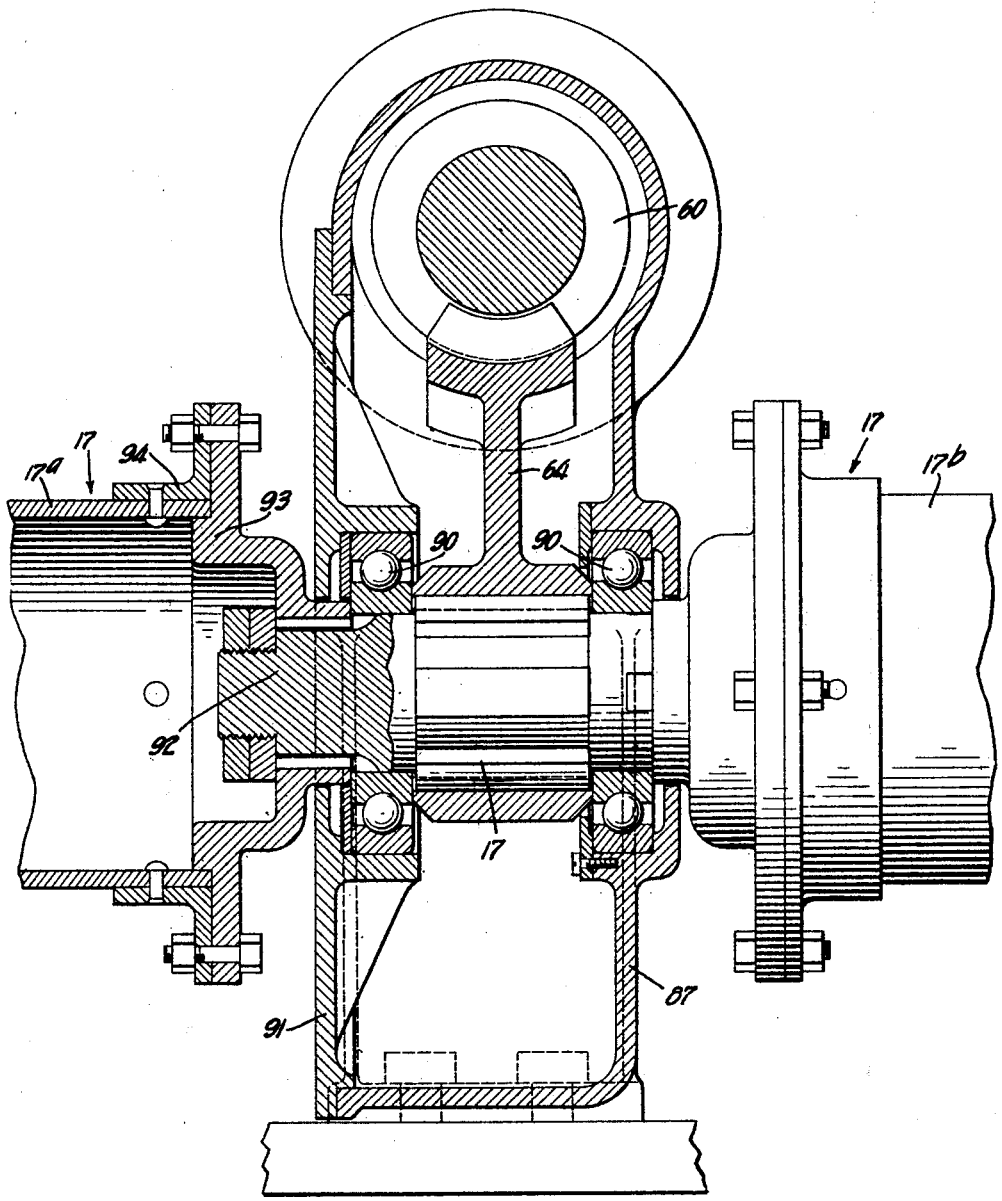

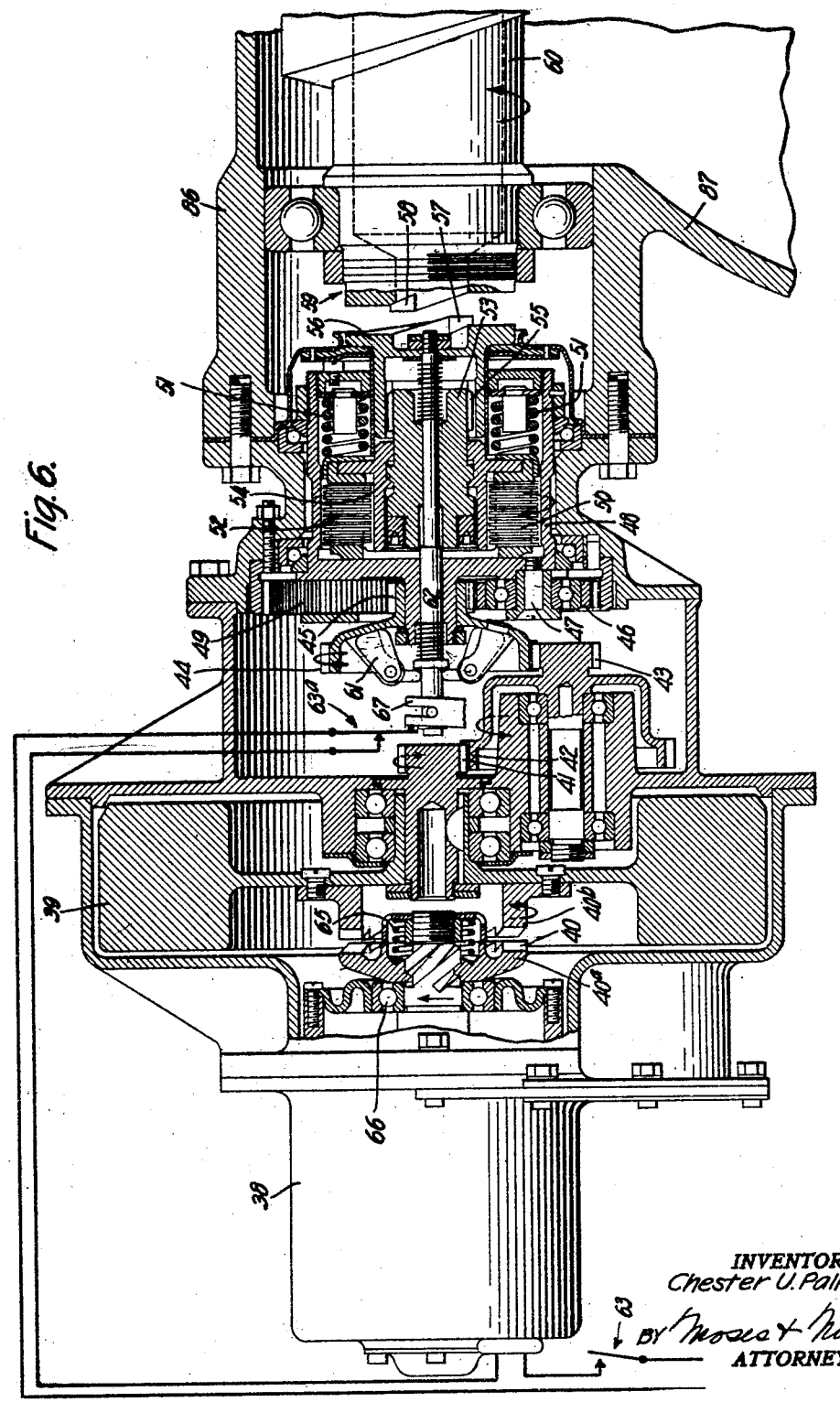

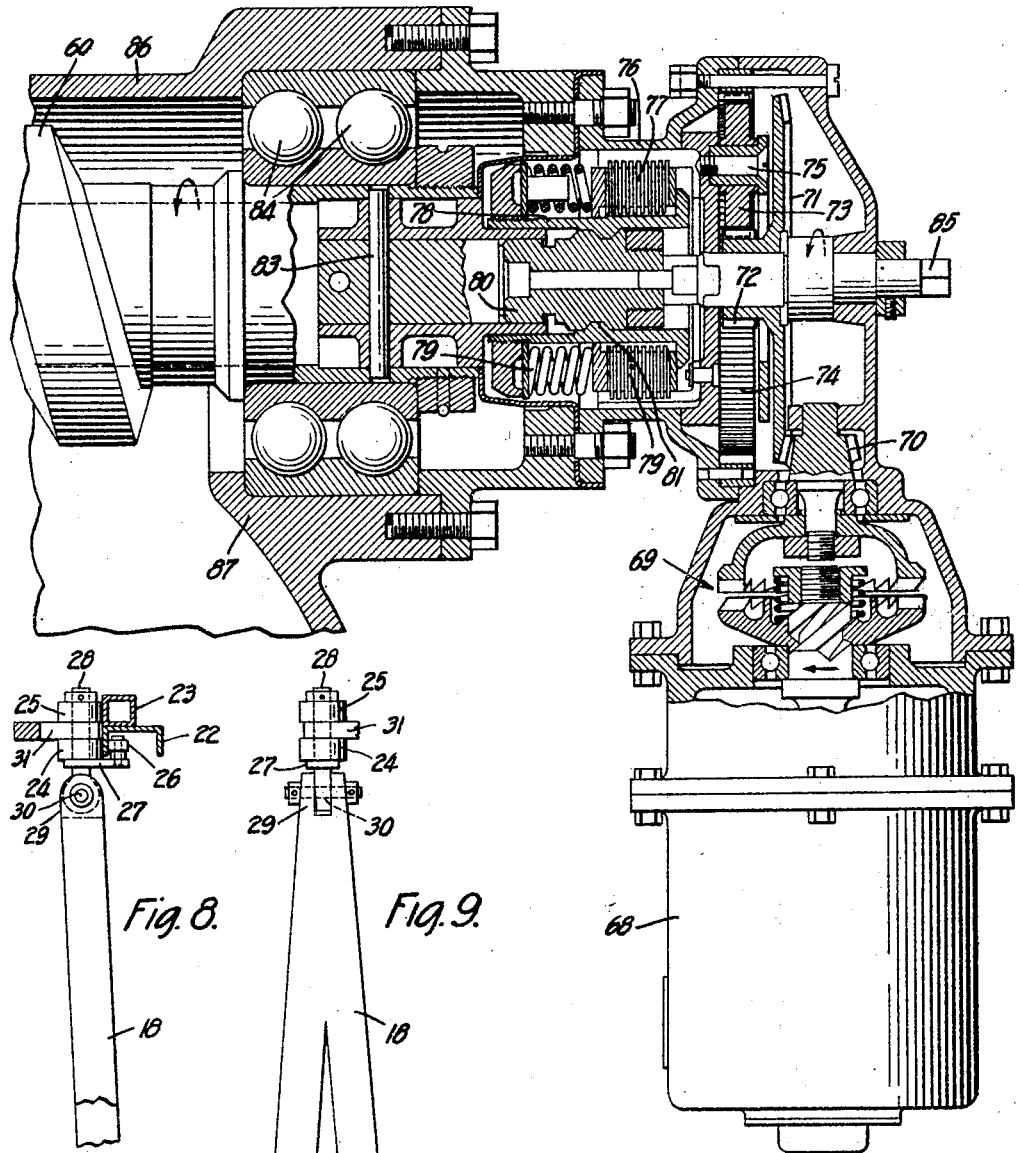
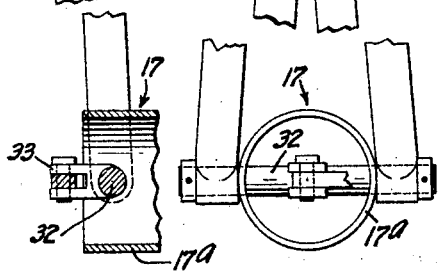
Fig. 7. Fig. 8. Fig. 9.

Patented Aug. 16, 1932

1,872,170

UNITED STATES PATENT OFFICE

CHESTER U. PALMER, OF NEW YORK, N. Y.

AIRCRAFT

Application filed October 20, 1930. Serial No. 489,887.

The present invention relates to improvements in aircraft of the type having wings which may be folded or retracted to an ineffective position while the aircraft is in flight. The present invention relates more particularly to the means for operating the auxiliary wings.

The present invention is also concerned with the provision of an auxiliary surface or surfaces for increasing the lifting power of the aircraft together with means for moving such surface or surfaces into and out of effective position. While the drawings, which accompany the present application and constitute a part thereof, together with the following specification disclose a specific embodiment of the invention in compliance with the statutory requirements, it will be understood that the present application and the scope thereof is not to be limited by the specific embodiment shown herein and that many modified improvements of the principle of the present invention may be devised which will fall within the scope of the appended claims.

For a full and complete understanding of the invention reference may now be had to the following detailed description taken with the annexed drawings in which Figure 1 is a view in vertical elevation of an airplane containing an illustrative embodiment of the invention and showing the auxiliary wing in its collapsed or folded and retracted position.

Figure 2 is a view of a portion of the airplane as shown in Figure 1 but showing the auxiliary wing in its effective position.

Figure 3 is an enlarged view, partly in section, and taken on the line 3—3 of Figure 1.

Figure 4 is a view in vertical elevation, partly in section, of the apparatus and devices for moving the said auxiliary wings from one position to the other.

Figure 5 is a sectional view of this apparatus taken on the line 5—5 of Figure 4.

Figure 6 is a vertical sectional view of the apparatus for opening the wings or for moving the same from ineffective to effective position.

Figure 7 is a vertical sectional view of the port on of the apparatus for closing the wing or wings or for moving the same from their effective to ineffective positions.

Figure 8 is a front view of a bracket carrying the auxiliary wing, and

Figure 9 is a lateral view thereof.

Referring to the drawings in detail, the reference character 10 designates the fuselage or structural body of an airplane or part of such body. While as shown herein the airplane employed for illustrating one specific embodiment of the invention is a modified monoplane type, it will be understood that the invention may be readily applied to any type of airplane or to any type of aircraft. The main wings of the aircraft are designated 11 and 12 and while they are shown as disposed in association with the upper portion of the fuselage 10, it will be understood that these main wings 11 and 12 may be associated with the fuselage in any approved manner.

The aircraft is provided with a pair of auxiliary wings 13, 14 which are so mounted with relation to the fuselage and with relation to the main wings 11 and 12 respectively, that the same may be moved to and held in the retracted position shown in Figure 1 of the drawings, in which position they are folded along the side walls of the fuselage. The shape of these auxiliary wings and their relation to the fuselage when in folded or retracted position may be observed also in Figure 3 of the drawings. The same wings may also be moved to and held in their effective position in which they extend laterally from the side walls of the fuselage, as shown in Figure 2. In order to provide for this movement of the auxiliary wings 13 and 14, the lower forward corner (referring to the retracted position) of each of these wings is connected by means of hinges 15 and 16 to a rotatable shaft 17 disposed transversely of the fuselage. Brackets 18 and 19 carried by each end of the shaft 17 and exteriorly of the fuselage and having a length approximately equal to the width of the auxiliary wings span the width of these wings and are hingedly connected to the other forward corner of the wings by means of the joints 20 and 21.

In order to secure the brackets 18 and 19 to the fuselage and to provide for the movement of these brackets in a plane approximately parallel to the side walls of the fuselage during the movement of the wings from their extended to their folded position or from their folded to their extended position, a guide 22 in the form of a channel iron shaped in the manner indicated in Figures 1 and 2 is mounted on each side of the fuselage. The channel iron also has mounted thereon the bar 23, as will be seen in Figure 8, and which preferably has one face thereof flush with the external leg of the channel iron 22. The other ends of the brackets 18 and 19 are provided with devices such as rollers 24 and 25 which move against the outer faces of the channel iron 22 and of the bar 23 respectively; the ends of these brackets 18 and 19 also carrying a roller 26 which engages the inner face of the outer leg of the channel iron 22; these devices serving thereby to restrain the movement of the brackets in a plane substantially parallel to the side walls of the fuselage. The rollers 24 and 25, as well as the arm 27 carrying the roller 26, are preferably carried by a stud 28 which is pivotally mounted within the bifurcation 29 of the end of the bracket 18 by means of the cross pin 30. The stud 28 also has pivoted thereon an arm 31 which is preferably disposed between the rollers 24 and 25 and is secured to the forward upper end of the auxiliary wing (referring to the wing in its folded position). The brackets 18 and 19, which are preferably V-shaped, straddle the shaft 17 at their opposed ends and are carried by the cross pin 32, as will be seen in Figures 8 and 9.

The cross pin also carries a universal joint or hinge 33 which connects the shaft 17 or the cross pin 32 with the lower forward corner of the auxiliary wing. A strut 34 is universally connected between one face of each auxiliary wing and the adjacent face of the corresponding main wing 11 or 12. It will be seen, therefore, that when the shaft 17 is rotated the brackets 18 and 19 are rotated with the shaft and guided by the strut 34 the auxiliary wings 13 and 14 are moved from their folded to their extended position or from their extended to their folded position, depending upon the direction of rotation of the shaft 17. The guide channel 22 and bar 23 are provided with a stop 35 at the upper end thereof, and with a stop 36 at the lower end. The guide channels and bars 22 and 23 preferably extend somewhat below the fuselage and are supported in that position by the struts 37.

Referring now to Figures 4, 5, 6 and 7, these will be seen to offer a detailed showing of the means and devices for rotating the shaft 17 so as to bring about the movement of the auxiliary wings from one position to the other.

Broadly the present invention contemplates the provision of an inertia starter, which may be similar to the one known as the Eclipse, for opening the auxiliary wings or for moving the same from folded to extended position. Referring to Figure 6, the inertia device comprises a source of motive power such as an electric motor 38, a fly wheel 39, a clutch 40 interposed between the motor and the fly wheel, a pinion 41 carried by said fly wheel and driving a gear 42; the latter carrying a pinion 43 which in turn is in driving engagement with a gear 44. The gear 44 has a pinion 45 which rotates a planetary gear 46 supported on a stud 47 which is secured to the clutch housing 48.

The planetary gear 46 cooperates with a stationary internal gear 49 thereby causing the stud 47 to act as a crank to rotate the clutch housing 48. The annular friction discs 50, which are spring pressed by means of the springs 51, are connected alternately to the clutch housing 48 and to the sleeve 52, the latter being in its turn connected to rotate the element 53 by means of the engagement 54. The element 53 is provided with teeth 55 which engage corresponding teeth interiorly of the clutch element 56. The clutch element 56 is provided with shoulders 57 which are designed to engage corresponding shoulders 58 on the cooperating clutch element 59 which is carried by the screw 60.

The gear 44 carries a speed responsive device 61 which is adjusted to move the shank 62 carried by the clutch element 56 outwardly when the fly wheel 39 has attained the speed of approximately twelve thousand revolutions per minute and thereby causing the engagement between the clutch elements 56 and 59 to rotate the screw 60. Simultaneous with the movement of the shank 62 and the engagement of the clutch element 56 with the cooperating clutch element 59, the switch 63 of the motor 38 is opened and the motor circuit is broken thereby causing the automatic disengagement of the clutch 40 and freeing the fly wheel 39 from the motor 38. The energy stored in the fly wheel is then employed for the rotation of the screw 60. The rotation of the screw 60 is transmitted to the shaft 17 by means of the worm sector 64 carried by the shaft 17. (See Figure 4.)

The shaft 17 which extends transversely of the fuselage and projects therefrom, is preferably provided at each end thereof with tubular portions 17$^a$ and 17$^b$ which are rotated with the shaft 17.

Referring now to various details of the device and apparatus thus far described and referring more particularly to Figure 6, it will be seen that the clutch 40 comprises two cooperating elements 40$^a$ and 40$^b$ provided with teeth or the like on their opposing face for causing positive engagement therebetween. The element 40ª is carried by the motor shaft and is normally held by means of a compression spring 65 spaced from the cooperating element 40ᵇ. The engagement between the clutch element 40ª and the motor shaft is of the screw type, as shown in Figure 6, with the result that the element 40ª is brought into positive engagement with the element 40ᵇ as soon as the motor shaft has acquired substantial rotational speed against the force of the spring 65. 66 indicates the motor shaft bearing. The engagement of the clutch element 40ª with the clutch element 40ᵇ which is carried by the fly wheel 39 serves to transmit the power of the motor to the fly wheel 39 and the fly wheel thereby is made to rotate at the same speed as the motor. It will be understood, however, that if desired, any gearing ratio may be interposed between the motor 38 and the fly wheel 39. The fly wheel is preferably so designed and its mass is preferably so selected that when it has attained a speed of approximately twelve thousand R. P. M. it will have a sufficient amount of stored energy to move both auxiliary wings from their folded to their extended positions under all conditions of wind and flight.

It will be understood, however, that in view of the fact that the stored energy of the fly wheel is a function of its mass and its speed of rotation, either the mass or the speed of rotation of the fly wheel may be altered in any desired manner just so long as the fly wheel and the motor are so designed that the fly wheel may store a sufficient amount of energy to operate the auxiliary wings.

The apparatus is preferably so designed that as long as the fly wheel has not yet acquired a desired amount of stored energy, the clutch elements 56 and 59 remain out of engagement and free of each other, the screw 60 is not rotated and the auxiliary wings remain in their folded position. The rotation of the fly wheel is transmitted by means of the pinion 41, gear 42 and pinion 43 to the gear 44. It will be seen that these gears and pinions cause the gear 44 to rotate at a reduced speed in comparison with the rate of rotation of the fly wheel 39. The speed responsive device 61, however, is so adjusted that when the fly wheel 39 will have reached a speed that corresponds to the desired amount of stored energy, the shank 62 will be moved longitudinally and the clutch element 56 will be thrown into engagement with the clutch element 59.

Prior to the engagement of the clutch elements 56 and 59, the rotation of the gear 44 will have been transmitted to the clutch element 56 in the manner which will have greatly reduced the speed of rotation of the clutch element 56 and thereby imparting to the same a very high torque. This is accomplished by means of the planetary gear 46 driven by the pinion 45, the planetary gear acting as a crank to rotate the slip clutch housing 48, this rotation being in turn transmitted to the clutch element 56 by means of the annular friction elements 50, sleeve 52, element 53, which has a tooth and slot engagement 55 with the clutch element 56. The torque applied to the shaft 17 is still further increased by means of the screw and worm engagement 60, 64.

If desired the automaticaly operated switch for a motor circuit may be eliminated and the operator then merely opens the starting switch 63a as soon as the clutch elements 56 and 59 engage each other.

67 shows a manual lever which may be employed when desired for effecting a manual engagement between the clutch elements 56 and 59.

The inertia or stored energy device described hereinabove which is employed for opening the wings or for moving the same from folded to extended position serves to operate the wings under all conditions of wind and flight and obviates any possible overloading of the motor 38. By the operation of this device, by the rotation of the shaft 17 and of the tubular portions thereof, 17ª and 17ᵇ, the brackets 18 and 19 are rotated and the wings 13 and 14 are rotated therewith. In view of the hinges or universal connections 15, 16, 20 and 21, and guided by the strut 34 the lower forward corner of the folded wings are retained approximately in the position indicated in Figure 1 whereas the upper forward corner will follow the arcuate guide 22. During this movement the wings guided by the strut 34 will also move outwardly and away from the fuselage with the result that when the brackets 18 and 19 reach the stops 36 the wings will have assumed the extended positions shown in Figure 2. At this point the clutch discs 50 will slip until the energy of the fly wheel will have become dissipated.

Referring now to Figure 7, this illustrates the apparatus and devices disposed at the opposite end of the screw 60 and designed to rotate the screw in the opposite direction so as to effect a closing of the wings. In view of the fact that the closing of the wings when in flight is assisted by the air pressure, the use of an inertia device between the motor and the screw 60 is not an essential element of this operation. For this reason the motor 68 is provided with a clutch 69 which is substantially identical with the clutch 40 associated with the motor 38. The pinion 70 driven by the clutch 69 in turn drives the gear 71. The pinion 72, which is integral with the gear 71, cooperates with the planetary gear 73 which also engages the fixed internal gear 74. The stud 75, upon which the planetary gear 73 is mounted, acts in the nature of a crank to rotate the slip clutch housing 76. The annular friction discs 77 are carried alternately by the element 76 and by the internal sleeve 78, the same being spring pressed and held in frictional engagement against each other by the springs 79. The rotation of the motor 68, therefore, transmits rotational power to the sleeve 78 which in turn transmits the same to the element 80 by virtue of the engagement 81 between the elements 78 and 80. The element 80 in its turn serves to rotate the sleeve 82, the latter being coupled to the screw 60 by means of the cross pin 83. This end of the screw 60 rotates together with its associated elements in the bearing 84.

The element 80 is provided with a projecting stud 85 whereby the screw 60 may be rotated manually by means of a manually operable crank to close the wings and if desired the same device may also be arranged to operate the screw 60 in either direction. When the operation of the closing of the wings is completed and the brackets 18 and 19 strike the stops 35, the discs 77 will slip until the power of the motor is turned off by switch S, Fig. 4.

Inspection of the drawings will show that the operating devices disposed between the two motors and at each end of the screw 60 are enclosed in a casing 86 and that the shaft 17 together with the sector 64 associated therewith are enclosed within a casing 87 which is preferably made integral with that portion of the casing 86 which houses the screw 60. The casing 87 also has integral legs 88 for mounting these elements as a unitary device on the floor of the fuselage. The tubular shafts 17ª and 17ᵇ, which constitute a part of the shaft 17, project exteriorly of the casing 87 through corresponding openings in the side walls of the fuselage, these opens being preferably reinforced by plates 89.

It should be understood that the worm 60 and the sector 64 of the drive disposed between the motors have the incidental advantage of constituting locking means for the wings. It will, however, be understood that any other suitable means may be used instead of said worm and sector, for transmitting the driving force to the wing.

The manner of association of the shaft 17 and the tubular shafts 17ª and 17ᵇ as well as the manner of housing the shaft 17 within the casing 87 is clearly shown in Figure 5. The shaft 17 rotates in the bearing 90 carried by the housing 87, the housing also comprising a closure plate 91 which carries the cooperating bearing 90'.

Each end of the shaft 17 is provided with a reduced portion 92 which is keyed to the plate 93. The tubular shafts 17ª and 17ᵇ are carried by the plate 93 by means of the annular angle plate 94.

It will be understood that the wing supporting means is not limited to the operating means illustrated including the inertia starter but that any other suitable operating means may be used therewith, as for example a hand operated mechanism.

While I have illustrated and described in detail a preferred form of my invention, it is to be understood that my invention may be embodied in other structures. I do not, therefore, desire to limit myself to the specific construction illustrated but intend to cover my invention in whatever form its principle may be utilized.

I claim:

1. In an airplane, the combination of a structural body, a pair of wings carried by said structural body and having an effective position and an ineffective position, and means for moving said wings from one position to the other comprising a source of motive power, an energy storing device, and means for transmitting power from the energy storing device to said wings.

2. In an airplane, the combination of a fuselage, a wing on each side of the fuselage, and means for moving said wing from a retracted to an advanced position, said means comprising a source of motive power, an energy storing device and means for transmitting power from the energy storing device to the said wings to move the latter from retracted to advanced position.

3. In the combination of a fuselage and a pair of wings carried by said fuselage and having an effective position and an ineffective position; means for moving said wings from one position to the other comprising a motor, an energy storing device operated by said motor, and means for operatively connecting said device to said wings when the device has stored sufficient energy to move the wings from one position to the other.

4. In the combination of a fuselage and a pair of wings carried by said fuselage and having an effective and an ineffective position; means for moving said wings from ineffective position to effective position comprising a motor, an energy storing device operated by said motor and means for operatively connecting said device to said wings when the device has stored sufficient energy to move the wings from the ineffective to the effective position.

5. In the combination of a fuselage and a pair of wings carried by said fuselage and having an effective and an ineffective position; means for moving said wings from one position to the other comprising a motor, an energy storing device operated by said motor, and means for operatively connecting said device to said wings when the device has stored sufficient energy to move the wings from the ineffective to the effective position.

6. In the combination of a fuselage and a pair of wings carried by said fuselage and having an effective position and an ineffective position; means for moving said wings from one position to the other comprising a motor, an energy storing device operated by said motor, and speed responsive means for operatively connecting said device to said wings when the device has stored sufficient energy to move the wings from one position to the other.

7. In the combination of a fuselage and a pair of wings carried by said fuselage and having an effective and an ineffective position; means for moving said wings from ineffective position to effective position comprising a motor, an energy storing device operated by said motor and speed responsive means for operatively connecting said device to said wings when the device has stored sufficient energy to move the wings from the ineffective to the effective position.

8. In the combination of a fuselage and a pair of wings carried by said fuselage and having an effective and an ineffective position; means for moving said wings from one position to the other comprising a motor, an energy storing device operated by said motor, and speed responsive means for operatively connecting said device to said wings when the device has stored sufficient energy to move the wings from the ineffective to the effective position.

9. In the combination of a fuselage and a pair of wings carried by said fuselage and having an effective position and an ineffective position; means for moving said wings from one position to the other comprising a motor, an energy storing device operated by said motor, and means for operatively connecting said device to said wings when the device has stored sufficient energy to move the wings from one position to the other and for disengaging said motor from said energy storing device.

10. In the combination of a fuselage and a pair of wings carried by said fuselage and having an effective and an ineffective position; means for moving said wings from ineffective position to effective position comprising a motor, an energy storing device operated by said motor and means for operatively connecting said device to said wings when the device has stored sufficient energy to move the wings from the ineffective to the effective position and for disengaging said motor from said energy storing device.

11. In the combination of a fuselage and a pair of wings carried by said fuselage and having an effective and an ineffective position; means for moving said wings from one position to the other comprising a motor, an energy storing device operated by said motor, and means for operatively connecting said device to said wings when the device has stored sufficient energy to move the wings from the ineffective position to the effective position and for disengaging said motor from said energy storing device.

12. In the combination of a fuselage and a pair of wings carried by said fuselage and having an effective position and an ineffective position; means for moving said wings from one position to the other comprising a motor, an energy storing device operated by said motor, and speed responsive means for operatively connecting said device to said wings when the device has stored sufficient energy to move the wings from one position to the other and for disengaging said motor from said energy storing device.

13. In the combination of a fuselage and a pair of wings carried by said fuselage and having an effective and an ineffective position; means for moving said wings from ineffective position to effective position comprising a motor, an energy storing device operated by said motor and speed responsive means for operatively connecting said device to said wings when the device has stored sufficient energy to move the wings from the ineffective to the effective position, and for disengaging said motor from said energy storing device.

14. In the combination of a fuselage and a pair of wings carried by said fuselage and having an effective and an ineffective position; means for moving said wings from one position to the other comprising a motor, an energy storing device operated by said motor, and speed responsive means for operatively connecting said device to said wings when the device has stored sufficient energy to move the wings from the ineffective to the effective position and for disengaging said motor from said energy storing device.

15. In the combination of a fuselage and a pair of wings carried by said fuselage and having an effective position and an ineffective position; means for moving said wings from one position to the other comprising an electric motor, an energy storing device operated by said motor, means for operatively connecting said device to said wings when the device has stored sufficient energy to move the wings from one position to the other, and a switch controlling said motor, said last named means also serving to open the said switch.

16. In the combination of a fuselage and a pair of wings carried by said fuselage and having an effective and an ineffective position; means for moving said wings from ineffective position to effective position comprising an electric motor, an energy storing device operated by said motor, means for operatively connecting said device to said wings when the device has stored sufficient energy to move the wings from the ineffective to the effective position, and a switch controlling said motor, said last named means also serving to open the said switch.

17. In the combination of a fuselage and a pair of wings carried by said fuselage and having an effective and an ineffective position; means for moving said wings from one position to the other comprising an electric motor, an energy storing device operated by said motor, means for operatively connecting said device to said wings when the device has stored sufficient energy to move the wings from the ineffective to the effective position, and a switch controlling said motor, said last-named means also serving to open said switch.

18. In the combination of a fuselage and a pair of wings carried by said fuselage and having an effective position and an ineffective position; means for moving said wings from one position to the other comprising an electric motor, an energy storing device operated by said motor, speed responsive means for operatively connecting said device to said wings when the device has stored sufficient energy to move the wings from one position to the other, and a switch controlling said motor, said last named means also serving to open said switch.

19. In the combination of a fuselage and a pair of wings carried by said fuselage and having an effective and an ineffective position; means for moving said wings from ineffective position to effective position comprising an electric motor, an energy storing device operated by said motor, speed responsive means for operatively connecting said device to said wings when the device has stored sufficient energy to move the wings from the ineffective to the effective position, and a switch controlling said motor, said last named means also serving to open the said switch.

20. In the combination of a fuselage and a pair of wings carried by said fuselage and having an effective and an ineffective position; means for moving said wings from one position to the other comprising an electric motor, an energy storing device operated by said motor, speed responsive means for operatively connecting said device to said wings when the device has stored sufficient energy to move the wings from the ineffective to the effective position, and a switch controlling said motor, said last named means also serving to open said switch.

21. In the combination of a fuselage and a pair of wings carried by said fuselage and having an effective position and an ineffective position: means for moving said wings from one position to the other comprising an electric motor, an energy storing device operated by said motor, means for operatively connecting said device to said wings when the device has stored sufficient energy to move the wings from one position to the other and for disengaging said motor from said energy storing device, and a switch controlling said motor, said means for connecting the device to the wings also serving to open the said switch.

22. In the combination of a fuselage and a pair of wings carried by said fuselage and having an effective and an ineffective position; means for moving said wings from ineffective position to effective position comprising an electric motor, an energy storing device operated by said motor, means for operatively connecting said device to said wings when the device has stored sufficient energy to move the wings from the ineffective to the effective position and for disengaging said motor from said energy storing device, and a switch controlling said motor, said means for connecting the device to the wings also serving to open the said switch.

23. In the combination of a fuselage and a pair of wings carried by said fuselage and having an effective and an ineffective position; means for moving said wings from one position to the other comprising an electric motor, an energy storing device operated by said motor, means for operatively connecting said device to said wings when the device has stored sufficient energy to move the wings from the ineffective position to the effective position and for disengaging said motor from said energy storing device, and a switch for controlling said motor, said means for connecting the device to the wings also serving to open the said switch.

24. In the combination of a fuselage and a pair of wings carried by said fuselage and having an effective position and an ineffective position; means for moving said wings from one position to the other comprising an electric motor, an energy storing device operated by said motor, speed responsive means for operatively connecting said device to said wings when the device has stored sufficient energy to move the wings from one position to the other and for disengaging said motor from said energy storing device, and a switch controlling said motor, said means for connecting the device to the wings also serving to open said switch.

25. In the combination of a fuselage and a pair of wings carried by said fuselage and having an effective and an ineffective position; means for moving said wings from ineffective position to effective position comprising an electric motor, an energy storing device operated by said motor, speed responsive means for operatively connecting said device to said wings when the device has stored sufficient energy to move the wings from the ineffective to the effective position, and for disengaging said motor from said energy storing device, and a switch controlling said motor, said means for connecting the device to the wings also serving to open the said switch.

26. In the combination of a fuselage and a pair of wings carried by said fuselage and having an effective and an ineffective position; means for moving said wings from one position to the other comprising an electric motor, an energy storing device operated by said motor, speed responsive means for operatively connecting said device to said wings when the device has stored sufficient energy to move the wings from the ineffective to the effective position and for disengaging said motor from said energy storing device, and a switch controlling said motor, said speed responsive means also serving to open the said switch.

27. In an airplane, the combination of a fuselage, a pair of wings carried by said fuselage and having an effective position and an ineffective position, and means for moving said wings from one position to the other comprising a source of motive power, an energy storing device, and means for transmitting power from the energy storing device to said wings, said last named means comprising a slip clutch.

28. In an airplane, the combination of a fuselage, a wing on each side of the fuselage, and means for moving said wing from a retracted to an advanced position, said means comprising a source of motive power, an energy storing device and means for transmitting power from the energy storing device to the said wings to move the latter from retracted to advanced position, said last named means comprising a slip clutch.

29. In the combination of a fuselage and a pair of wings carried by said fuselage and having an effective position and an ineffective position; means for moving said wings from one position to the other comprising a motor, an energy storing device operated by said motor, and means for operatively connecting said device to said wings when the device has stored sufficient energy to move the wings from one position to the other, said last named means comprising a slip clutch.

30. In the combination of a fuselage and a pair of wings carried by said fuselage and having an effective and an ineffective position; means for moving said wings from one position to the other comprising a motor, an energy storing device operated by said motor, and means for operatively connecting said device to said wings when the device has stored sufficient energy to move the wings from the ineffective to the effective position, said last named means comprising a slip clutch.

31. In the combination of a fuselage and a pair of wings carried by said fuselage and having an effective position and an ineffective position; a rotatable shaft disposed transversely of the fuselage for moving said wings from one position to the other and in the reverse direction, a second shaft disposed longitudinally of the fuselage, means interposed between said shafts for transmitting power from the second shaft to the first shaft, a motor associated with one end of said second shaft for rotating the same in one direction, an energy storing device interposed between said motor and said second shaft, and a second motor associated with the other end of said second shaft for rotating the same in the reverse direction.

32. In the combination of a fuselage, and a pair of wings carried by said fuselage and having an effective position and an ineffective position; a rotatable shaft disposed transversely of the fuselage for moving said wings from one position to the other and in the reverse direction, a second shaft disposed longitudinally of the fuselage, means interposed between said shafts for transmitting power from the second shaft to the first shaft, a motor associated with one end of said second shaft for rotating the same in one direction, an energy storing device normally disconnected from said second shaft interposed between said motor and said second shaft, and a second motor associated with the other end of said second shaft for rotating the same in the reverse direction.

33. In the combination of a fuselage and a pair of wings carried by said fuselage and having an effective position and an ineffective position; a rotatable shaft disposed transversely of the fuselage for moving said wings from one position to the other and in the reverse direction, a second shaft disposed longitudinally of the fuselage, means interposed between said shafts for transmitting power from the second shaft to the first shaft, a motor associated with one end of said second shaft for rotating the same in one direction, an energy storing device normally disconnected from said second shaft interposed between said motor and said second shaft, speed responsive means interposed between said energy storing device and said second shaft for connecting said device to said second shaft, and a second motor associated with the other end of said second shaft for rotating the same in the reverse direction.

34. In an aircraft, the combination of a fuselage, a rotatable shaft disposed transversely thereof and projecting laterally therefrom, an arm carried by each end of said shaft and rotatable therewith in a plane substantially perpendicular to the said shaft, an arcuate guide carried by each side wall of the fuselage and engaging the other end of each arm and holding the same against movement away from the fuselage, and a wing hingedly connected to each of said arms at the ends of said arms.

In testimony whereof, I have affixed my signature to this specification.

CHESTER U. PALMER.